United States Patent
Peglowski et al.

(10) Patent No.: US 10,520,046 B2
(45) Date of Patent: Dec. 31, 2019

(54) LOW BACKLASH MULTIMODE CLUTCH

(71) Applicant: BorgWarner Inc., Auburn Hills, MI (US)

(72) Inventors: Brett Peglowski, Oakland, MI (US); Calahan B. Campton, Royal Oak, MI (US); Michael W. Campbell, Royal Oak, MI (US)

(73) Assignee: BorgWarner Inc., Auburn Hills, MI (US)

( * ) Notice: Subject to any disclaimer, the term of this patent is extended or adjusted under 35 U.S.C. 154(b) by 61 days.

(21) Appl. No.: 15/843,162

(22) Filed: Dec. 15, 2017

(65) Prior Publication Data

US 2018/0172088 A1   Jun. 21, 2018

Related U.S. Application Data

(60) Provisional application No. 62/434,810, filed on Dec. 15, 2016.

(51) Int. Cl.
*F16D 41/12*     (2006.01)
*F16D 41/04*     (2006.01)
*F16D 41/066*    (2006.01)
*F16D 41/07*     (2006.01)

(52) U.S. Cl.
CPC ............ *F16D 41/12* (2013.01); *F16D 41/04* (2013.01); *F16D 41/066* (2013.01); *F16D 41/07* (2013.01)

(58) Field of Classification Search
CPC .......... F16D 41/04; F16D 41/12; F16D 41/16; F16D 41/066; F16D 41/07
See application file for complete search history.

(56) References Cited

U.S. PATENT DOCUMENTS

| | | | |
|---|---|---|---|
| 2007/0089958 A1* | 4/2007 | Kanehisa | F16D 41/30 192/64 |
| 2008/0110715 A1* | 5/2008 | Pawley | F16D 25/061 192/43.1 |
| 2011/0168511 A1* | 7/2011 | Yamamoto | B62M 6/45 192/45.006 |
| 2016/0201738 A1* | 7/2016 | Kimes | F16D 27/00 192/84.8 |

* cited by examiner

*Primary Examiner* — Jacob S. Scott
*Assistant Examiner* — Lori Wu
(74) *Attorney, Agent, or Firm* — Miller, Matthias & Hull LLP

(57) ABSTRACT

A low-backlash multimode clutch includes a one-way bearing allowing rotation in a first direction as well as a number of actuatable pawls in one race and a number of receiving slots having engagement faces in the other race. The engagement faces are tilted such that when the pawls are actuated, any torque applied in the first direction tends to force the pawls outward but the pawls are retained inward, such as by actuator rods. In this way, the one-way clutch may be selectively locked and unlocked with zero backlash against the one-way bearing.

10 Claims, 5 Drawing Sheets

LOW BACKLASH MULTIMODE CLUTCH

CROSS-REFERENCE TO RELATED APPLICATIONS

This application claims the benefit of U.S. patent application Ser. No. 62/434,810 filed on Dec. 15, 2016, the disclosure of which is herein incorporated by reference in its entirety.

TECHNICAL FIELD

This disclosure relates generally to multimode mechanical clutches and more particularly to multimode mechanical clutch having low or zero backlash.

BACKGROUND

Clutches are used in a great many technical fields, with one of the primary fields of use being automotive technology. Within this field, various types of clutches are used for various applications. For example, a vehicle transmission may include one or more gear sets including an inner gear, intermediate planet or pinion gears supported by their carriers, and outer ring gears. In addition to such planetary gear sets, driveline components frequently include multi-disc friction devices that are employed as clutches or brakes.

The multi-disc pack clutch is a friction device that is commonly employed as a holding mechanism in a transmission. In addition, one-way clutches are frequently employed in transmissions to selectively transmit torque in one rotational direction, but not in the opposite rotational direction. To this end, one-way clutches typically include an inner race, an outer race, and an engagement mechanism disposed therebetween. The engagement mechanism is operable to lock the inner and outer races together thereby transmitting torque in one relative direction. The engagement mechanism is further operable to allow freewheeling rotation between the inner and outer races in the opposite rotational direction. Engagement mechanisms commonly used in one-way clutches of the related art include pawls, sprags, and rollers. A cage, along with biasing members, such as springs, are also sometimes employed to retain the pawls, sprags, or rollers between the inner and outer races as well as to selectively assist in the change of operational modes between torque translation and freewheeling actuation of the clutch, depending on the direction of rotation between the inner and outer races.

As noted above, one-way clutches of this type have been employed in numerous applications in transmission, transfer cases, and differentials. For example, one-way clutches have been employed in conjunction with multiple friction clutches and planetary gear sets to effect low and reverse gear ratios in conventional transmissions. However, selectable one-way clutches typically require a certain amount of backlash to switch modes, and this backlash may cause driveline jolts that can be felt by a driver or operator.

Accordingly, there remains a need in the art for a selectable multi-mode clutch assembly that can provide torque translation in either rotational direction while also minimizing or eliminating the backlash inherent in prior art designs.

SUMMARY OF THE DISCLOSURE

In one aspect of the present disclosure, a low-backlash multimode clutch is provided having an annular inner race and an annular outer race concentric to the inner race, a one-way bearing allowing relative rotation of the races in a first direction but not a second direction and a plurality of pawls pivotably pinned to the outer race, each having a pivot point at the respective pin and a pawl engagement face. One or more actuator elements are included and are configured to selectively apply an inward force to the pawls, while a plurality of receiving slots formed in the inner race include an engagement face for engaging one of the plurality of pawls. The engagement face of each slot is oriented such that relative rotation of the inner and outer races in the first direction is blocked by engagement of at least one of the plurality of pawls under the inward force applied by at least one of the one or more actuator elements, and such that torque applied in the first direction imposes and outward force on the at least one of the plurality of pawls.

The plurality of pawls may include an even number of pawls installed in symmetric pair positions on the outer race, and the receiving slots may also be located in diametrically opposed pairs but at uneven intervals such that only a subset of the pawls are engaged at any given point in time.

The one or more actuator elements may be electronically actuated, hydraulically actuated or mechanically actuated.

In a further embodiment, a multi-mode one-way clutch is provided having an inner race and an outer race and a one-way bearing between the inner and outer races permitting rotation in a first direction but not a second direction. A plurality of pawls is pivotably installed on one of the inner and outer races, each pawl having a pivot point and an engagement face. A plurality of actuator elements are included, each being linked to one of the pawls to selectively apply an inward force. A plurality of receiving slots formed in the other of the inner and outer races having engagement faces tilted such that when the plurality of actuator elements are actuated to engage the clutch and torque is applied to the clutch in the first direction, each receiving slot applies an ejection force to any pawl that has seated therein, and such that disengagement of the clutch is backlash-free.

In yet another embodiment, a method is provided for forming a multi-mode one-way clutch by forming a plurality of pawls, each pawl having a pivot point and an engagement face, and attaching the plurality of pawls to a first annular race via respective pawl pivot pins, such that each pawl is selectively biased away from the first annular race by an associated actuator rod. A second annular race is placed concentric with the first annular race, with a one-way bearing between the first and second races. The second annular race including a plurality of receiving slots, each receiving slot having an engagement face therein, such that relative rotation between the first and second annular races is permitted in a first direction by the one-way bearing but may be selectively blocked by engagement of the one or more pawls via the one or more actuator elements. The engagement face of at least one receiving slot applies an ejecting force to a pawl seated in that receiving slot when the clutch is engaged and torque is applied in the first direction.

Additional aspects are defined by the claims of this patent.

DETAILED DESCRIPTION

Although the following text sets forth a detailed description of numerous different embodiments, it should be understood that the legal scope of protection is defined by the words of the claims set forth at the end of this patent. The detailed description is to be construed as exemplary only and does not describe every possible embodiment, since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain and ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity so as to not confuse the reader, and it is not intended that such claim term be limited, by implication or otherwise, to that single meaning.

By way of overview, clutches according to various embodiments of the described principles incorporate one or more radiused pawls to prevent movement between an inner race and an outer race of the clutch in at least one direction, while a one-way bearing prevents rotation in the opposite direction. The inner race in the illustrated examples includes one or more radiused receiving slots, with the radius of the receiving slot being the same as, the radius of the pawl when the pawl is engaged, with the center of the radii being above the pawl pivot point to provide a disengagement force upon the application of torque in the blocked direction.

In this way, engagement and disengagement of a pawl in a receiving slot may be accomplished with little or no backlash. As a corollary effect, the engagement force holding the pawl inward is slightly negative, which forces the pawl out of engagement upon the application of torque unless a pawl actuator forces the pawl inward.

Figure 1:
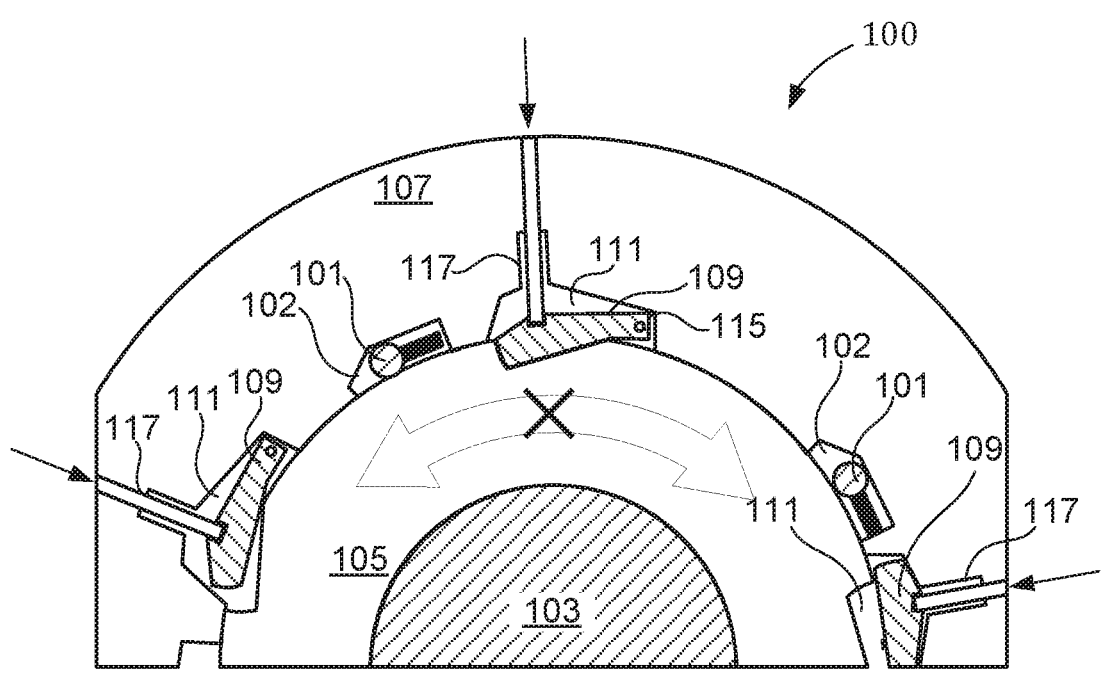
FIG. 1 is a partial front cross-sectional view of an example clutch in keeping with an embodiment of the disclosed principles wherein the clutch is engaged.

Turing now to FIG. 1, this figure shows a partial front cross-sectional view of an example clutch in keeping with an embodiment of the disclosed principles. The illustrated multimode clutch 100 incorporates an interior driven shaft 103 and an inner race 105 affixed to the shaft 103 for rotation therewith. Rotation of a concentrically located outer race 107 about the inner race 105 is permitted in one direction by a one-way bearing, e.g., a one-way roller bearing including rollers 101 and ramps 102. It will be appreciated that although roller bearings are used herein for illustrative examples, any type of one-way bearing may be used in lieu of or in addition to the illustrated roller bearings. Various types of one-way bearings are mentioned above, and any of these would be suitable, as would other types not listed.

Rotation of the outer race 107 about the inner race 105 in the direction permitted by the one-way bearing may be selectively prevented by a selectable one-way clutch, e.g., a pawl clutch including one or more actuatable pawls 109 and corresponding receiving slots 111. Those skilled in the art will understand that, alternatively, the shaft 103 may be operatively connected to the outer race 107 or that both races 105, 107 may be driven at different points in time.

As disclosed, the one or more pawls 109 are hinged to the outer race 107 in the illustrated example via pins 115. Moreover, the pawls 109 may be actuated inwardly or outwardly via actuator rods 117. The actuator rods 117 may be actuated electronically, hydraulically or mechanically. An example of mechanical actuation involves a cuff or collar surrounding the outer race close to the axial position of the actuator rods 117. Movement of the cuff over the rod ends forces the rods 117 inward, opposing the ejection of the pawls 109 from the slots 111.

Although only three pawls 109 and three receiving slots 111 are shown in FIG. 1, a greater or lesser number may be used. In an embodiment, the pawls 109 and receiving slots 111 are employed in diametrically opposed pairs. In this way, engagement of the clutch will not cause substantial radial loading. While the pawls 109 may be symmetrically located around the outer race 107, the receiving slots 111 of the inner race 105 may be located at varied fractional offsets instead and not symmetrically placed. In this way, the dead space between engagement angles can be minimized.

For example, if all pawls 109 and receiving slots 111 in the clutch of FIG. 1 were to be symmetrically spaced, all pawls 109 would engage at a certain angle, and no pawls 109 would engage at any other angle. Thus the dead space between engagements would be the distance between pawls 109. In contrast, with symmetric placement of three pairs of pawl 109 coupled with fractional offsetting of three pairs of receiving slots 111, the dead space between engagements can be as small as one third of the distance between pawls 109. Thus, in the illustrated example, the top pawl 109 is engaged, but the left pawl 109 is only one third of the pawl separation away from engagement.

As noted above, the pawls 109 and receiving slots 111 are radiused in an embodiment of the disclosed principles to provide little or no backlash during engagement or disengagement. This can be seen in greater clarity in FIG. 3 below, which is an enlarged partial cross-sectional view of the example clutch of FIG. 1 showing detail of the outer and inner races at the pawl location in keeping with an embodiment of the disclosed principles.

Figure 2:
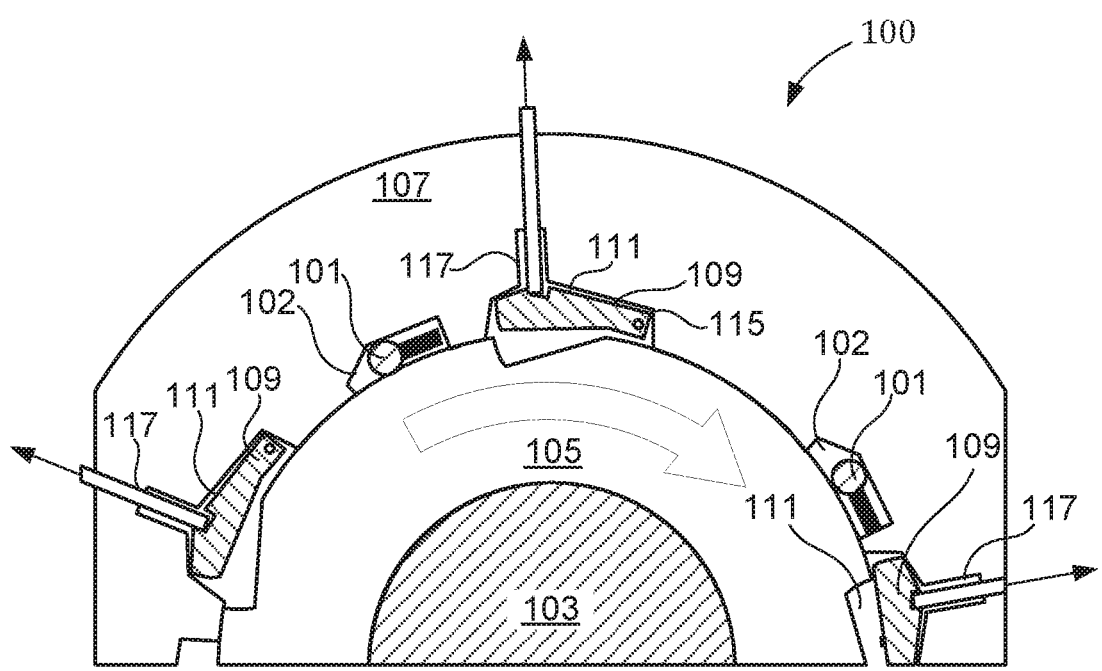
FIG. 2 is a partial front cross-sectional view of an example clutch in keeping with an embodiment of the disclosed principles wherein the clutch is disengaged.

FIG. 2 is a partial front cross-sectional view of the selectable unidirectional clutch of FIG. 1, wherein the clutch is disengaged via the pawls 109 being forced inward by the actuator rods 117. As can be seen, the inner race 105 is now free to rotate as permitted by the one-way roller bearing, that direction being clockwise in the illustrated example.

Figure 3:
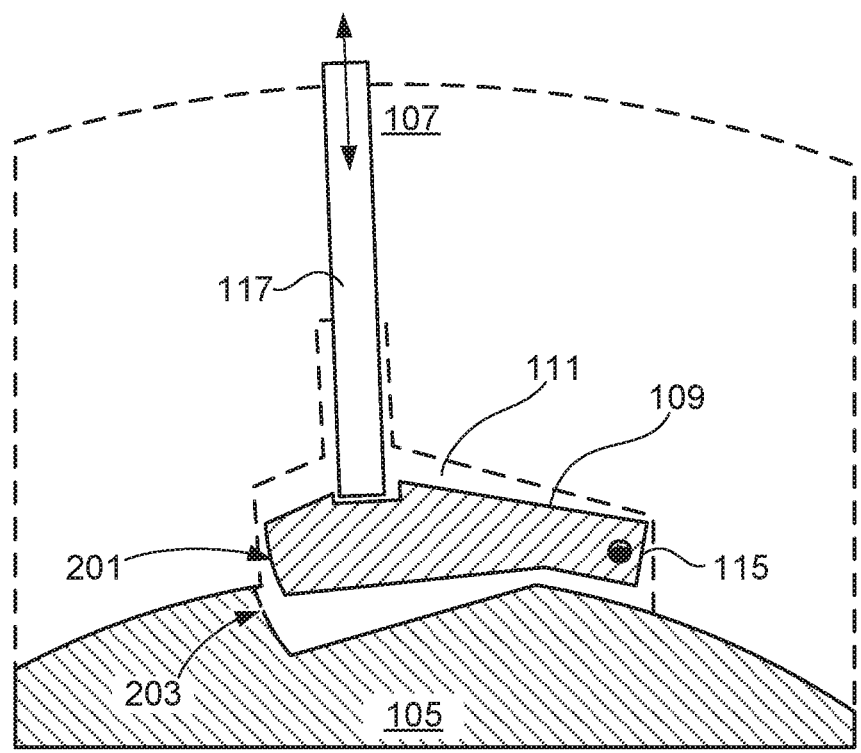
FIG. 3 is a schematic detail view of an actuatable pawl in keeping with an embodiment of the disclosed principles.

As shown in FIG. 3, an engagement face 201 of the pawl 109 mates with an engagement face 203 of the receiving slot 111 when the clutch is engaged via this pawl 109. In the illustrated example, each engagement face 201, 203 is radiused on a circle centered above the pawl retaining pin 115. In this way, when the pawl 109 rotates inwardly or outwardly about the pin 115, the engagement faces 201, 203 disengage without causing or requiring angular backlash between the inner race 105 and the outer race 107. This results in zero backlash when the selectable one-way clutch is engaged or disengaged.

By varying the engagement face circle center or even using a straight face angled for negative retention force, the retention force can be changed without adding any backlash. This will tune the torque-based retaining (or ejection) force acting on the pawl 109. This effect is illustrated in the example of FIG. 4.

Figure 4:
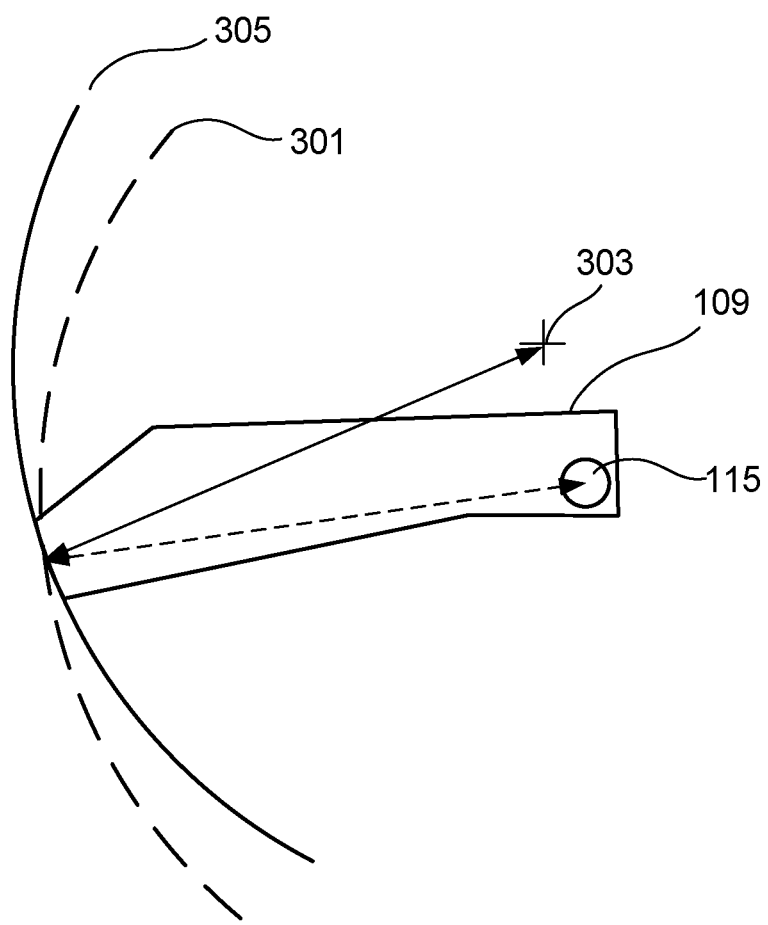
FIG. 4 is an enlarged partial cross-sectional view of the inner race of the example clutch of FIG. 1 showing engagement of the radiused pawl in a radiused notch of the inner race in keeping with an embodiment of the disclosed principles.

With reference to FIG. 4, the geometries of the pawl and receiving slot engagement faces 201, 203 (FIG. 3) are now described. The arc 301 illustrated in dashed line form is centered on the pawl retaining pin 115, whereas the arc 305 actually incorporated in the pawl 109 and receiving slot 111 engagement faces 201, 203 (FIG. 3) is canted forward, creating a negative retaining force. The center 303 of the arc 305 is as shown (FIG. 4). As can be seen in this configuration, the pawl 109 can be pivoted out of engagement with the receiving slot 111 without requiring displacement between the inner race 105 and outer race 107 (FIG. 3).

Figure 5:
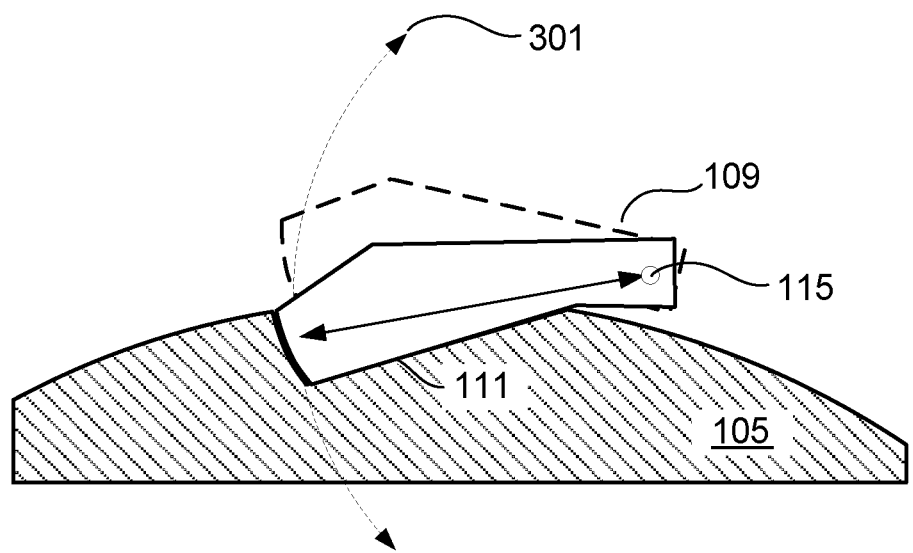
FIG. 5 is an enlarged partial cross-sectional view of a bi-directional clutch assembly in keeping with an embodiment of the disclosed principles.

FIG. 5 shows the engagement arc 301 of the pawl 109 and receiving slot 111 for the scenario above, wherein the arc of the engagement faces 201, 203 and the arc of engagement 301 are both centered above the pawl retaining pin 115.

While a unidirectional selective clutch has been illustrated in the foregoing figures, it will be appreciated that the same zero backlash principles may be applied in a bidirectional selectable clutch.

In an embodiment, the pawls 109 have a point or other non-radiused engagement face while the slots 111 have a curved, linear or piece-wise linear engagement face. As in other embodiment, the engagement face of the slot 111 may be tilted to provide an ejection force to the pawls 109 when the inner race 105 is rotated in the direction permitted by the one-way roller bearing.

While the foregoing examples show pawls associated with an outer race and receiving slots associated with an inner race, it will be appreciated that these roles may be reversed. In particular, pawls may be carried by the inner race and may cooperate with receiving slots in the outer race. In the case, selective activation may entail either blocking the receiving slots if actuation from beyond the outer race is required, or selectively biasing the pawls if internal actuation is required. For example, the axial sliding of the inner race over a rise on the inner shaft may serve to bias the pawls against their inherent spring bias.

Moreover, as noted above, while one-way roller bearings are used in the included examples where a one-way bearing is needed, it will be appreciated that these are just examples and that any other type of one-way bearing may be used in lieu of or in addition to the illustrated roller bearings.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

What is claimed is:

1. A multimode clutch comprising:
    an annular inner race and an annular outer race concentric to the inner race;
    a one-way bearing allowing relative rotation of the races in a first direction but not a second direction;
    a plurality of pawls pivotably pinned to the outer race, each having a pivot point at the respective pin and a pawl engagement face;
    one or more actuator elements configured to selectively apply an inward force to the pawls; and
    a plurality of receiving slots formed in the inner race, with each receiving slot having an engagement face for engaging the engagement face of one of the plurality of pawls, the engagement face of each slot being oriented such that relative rotation of the inner and outer races in the first direction is blocked by engagement of at least one of the plurality of pawls under the inward force applied by at least one of the one or more actuator elements, and such that torque applied in the first direction imposes an outward force on the at least one of the plurality of pawls;
    wherein the one-way bearing comprises a circumferentially oriented ramp and a roller, both disposed within a recess situated radially between the inner and outer races, the roller being interactive with the ramp; and
    wherein the ramp urges the roller radially inwardly for blocking the inner and outer races from relative rotation in only the second direction.

2. The multimode clutch in accordance with claim 1, wherein the plurality of pawls includes an even number of pawls and wherein the even number of pawls are installed in symmetric pair positions on the outer race.

3. The multimode clutch in accordance with claim 2, wherein the plurality of receiving slots are located in diametrically opposed pairs at uneven intervals on the inner race such that only a subset of the pawls are engaged at any given point in time.

4. The multimode clutch in accordance with claim 1, further comprising a cuff to actuate the one or more actuator elements.

5. The multimode clutch in accordance with claim 1, wherein the one or more actuator elements are electronically actuated.

6. The multimode clutch in accordance with claim 1, wherein the one or more actuator elements are hydraulically actuated.

7. A multi-mode one-way clutch comprising:
    an inner race and an outer race;
    a one-way bearing between the inner and outer races permitting rotation in a first direction but not a second direction;
    a plurality of pawls pivotably installed on the outer race, each pawl having a pivot point and an engagement face;
    a plurality of actuator elements, each linked to one of the pawls to apply a radially inward force selectively; and
    a plurality of receiving slots formed in the inner race, each receiving slot having an engagement face tilted such that when the plurality of actuator elements are actuated to engage the clutch and torque is applied to the clutch in the first direction, each receiving slot applies an ejection force to any pawl that has seated therein;
    wherein the one-way bearing comprises a circumferentially oriented ramp and a roller, both disposed within a recess situated radially between the inner and outer races, the roller being interactive with the ramp; and
    wherein the ramp urges the roller radially inwardly for blocking the inner and outer races from relative rotation in only the second direction.

8. The multi-mode one-way clutch in accordance with claim 7, wherein the plurality of pawls includes an even number of pawls and wherein the even number of pawls are installed in symmetric pair positions on the outer race.

9. The multi-mode one-way clutch in accordance with claim 8, wherein the plurality of receiving slots are located in diametrically opposed pairs at uneven intervals such that during clutch engagement only a subset of the pawls are engaged at any given point in time.

10. The multi-mode one-way clutch in accordance with claim 7, further comprising a cuff to actuate the one or more actuator elements.

* * * * *